F. BEEMER.
HOLDER FOR METAL BALL MAKING.
APPLICATION FILED SEPT. 24, 1908.

1,014,746.

Patented Jan. 16, 1912.
2 SHEETS—SHEET 1.

WITNESSES:

INVENTOR
Frank Beemer
BY
Augustus B Stoughton
ATTORNEY

F. BEEMER.
HOLDER FOR METAL BALL MAKING.
APPLICATION FILED SEPT. 24, 1908.

1,014,746.

Patented Jan. 16, 1912.
2 SHEETS—SHEET 2.

WITNESSES:

INVENTOR
Frank Beemer
BY
ATTORNEY.

UNITED STATES PATENT OFFICE.

FRANK BEEMER, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

HOLDER FOR METAL-BALL MAKING.

1,014,746.  Specification of Letters Patent.  Patented Jan. 16, 1912.

Application filed September 24, 1908. Serial No. 454,591.

*To all whom it may concern:*

Be it known that I, FRANK BEEMER, a citizen of the United States, residing at the city of Philadelphia, in the county of Philadelphia and State of Pennsylvania, have invented a certain new and useful Holder for Metal-Ball Making, of which the following is a specification.

In the manufacture of metal balls they are caused to travel through concentric paths and to change from path to path between two relatively rotating bodies one of which operates as a holder and the other of which performs the desired operation such as grinding, finishing or the like on the balls.

The object of the present invention is to cause the holder to impart to the balls as they travel in concentric paths a twisting movement about their own centers, or in other words, a rotating movement about changing polar axes whereby they present changing equatorial zones and are thus produced of absolutely the same size, of perfect sphericity and of fine finish, and to this end the invention comprises the holder to be presently described and claimed at the end hereof.

Figure 1:
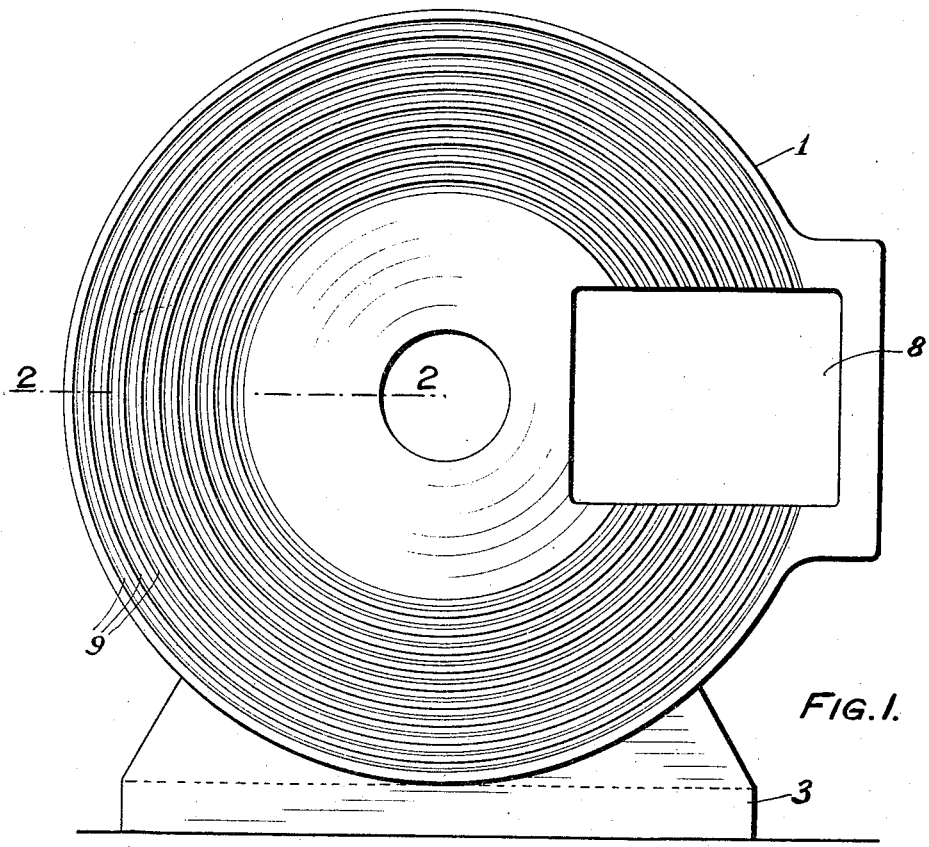
Figure 2:
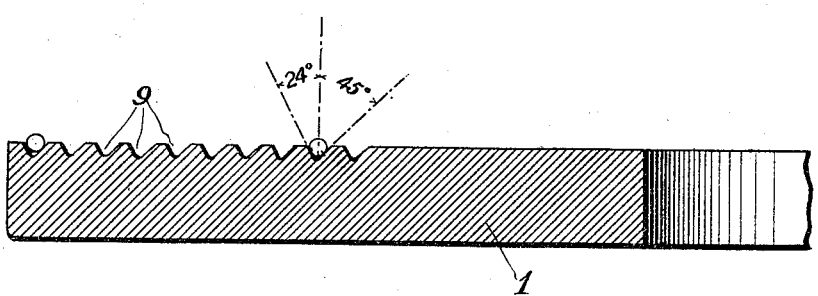
Figure 3:
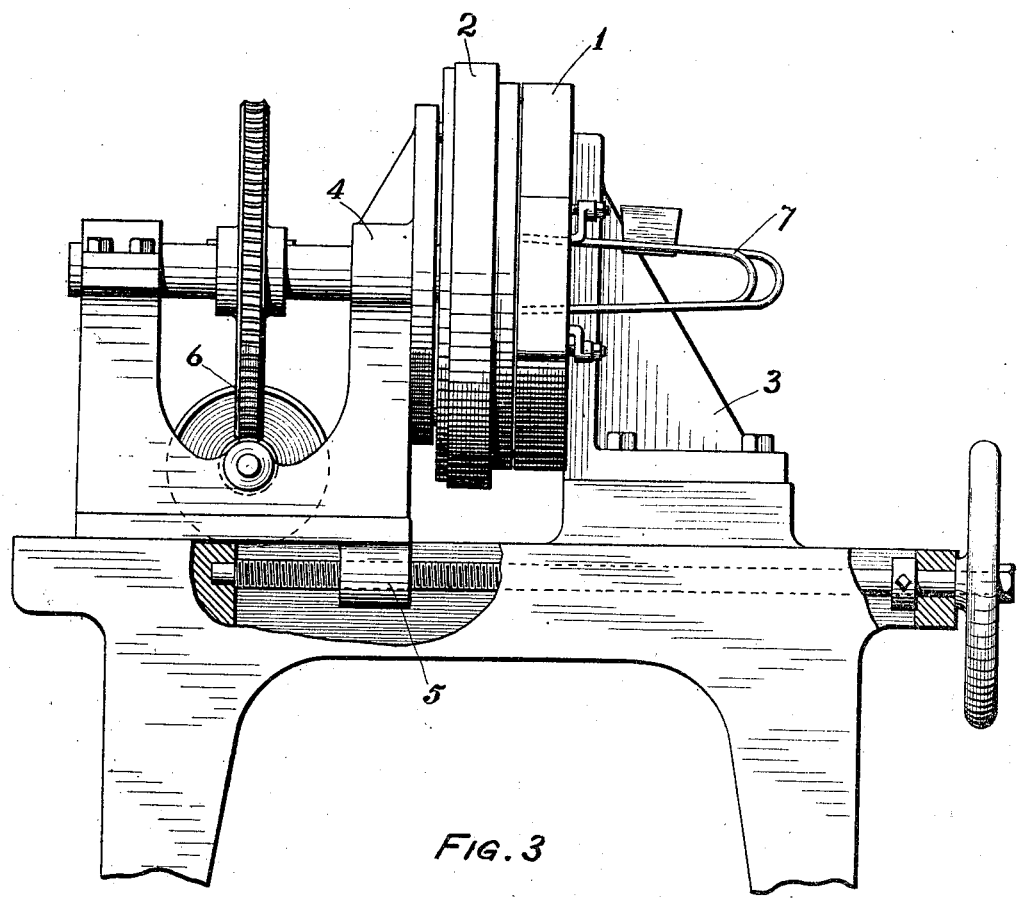

In the drawings I have illustrated one embodiment of the invention and in them Figure 1, is a face view of a holder embodying features of the invention. Fig. 2, is a sectional view taken on the line 2—2, and drawn to an enlarged scale, and Fig. 3, is a side view of a machine showing the holder in application thereto.

In the drawings 1, is the holder and it is relatively rotatable in respect to the body 2, about a common axis. The body 2, may be a grinding disk, as of emery, or a disk of material appropriate for performing the desired operation. In the machine chosen for description the holder 1, is carried by a head 3, and the disk 2, is rotatably mounted in a bracket 4.

5, are means for shifting the bracket 4, to exert pressure on the balls or ball blanks between the rotating bodies 1 and 2.

6, are means for rotating the disk 2.

7, are a series of U-shaped tubes carried by plates fitted in the opening 8, and they serve to transfer the balls from one groove to another. They constitute subject-matter of my application serially numbered 454,592 and are not specifically claimed herein.

In accordance with my invention the balls as they travel in the concentric grooves in the holder 1, have imparted to them a twisting movement about their own centers so that all parts of their surfaces are presented to the body 2, which may have a flat face or may have in its face concentric grooves such are naturally worn therein. The grooves 9, in the holder are generally V-shaped or angular and therefore there are two points of contact between the walls of the groove and each ball. These points of contact as the balls travel describe circles about the center of the holder. If the circumferences of the circles drawn through the points of contact and constituting zones of the ball bear the same proportion to the circumferences of the corresponding circular paths, then each of the balls in traveling between the bodies 1 and 2, will rotate about substantially the same polar axis and therefore present substantially the same equatorial zone. In a holder of the invention the inclination of the walls of the grooves may be such that this does not occur and that on the contrary the balls are caused as they travel in circles to rotate about different polar axes and thus present changing equatorial zones, comprising all of their surfaces, to the rotating body 2. However, as I have pointed out there is an advantage to be derived from the use of such an angle as will produce twisting of the balls about their centers. The angle between the walls of the grooves may vary considerably and yet produce the described twisting motion of the balls so that I do not limit myself to the angle which I will give as an illustration, but referring to Fig. 2, when the wall nearest the center is at 45° to the perpendicular and the other wall is at 24°, the twisting effect is pronounced.

What I claim is:

In combination a ball holder having grooves angular in cross-section with the walls thereof disposed at such relative inclination as to present two paths of contact the lengths of which do not bear the same proportion to the length of the circumferences of the corresponding contact zones of the balls, a grinder, means for rotating one of these elements, and means for progressively and repeatedly feeding each of the balls through the entire length of all the grooves from the inlet to the outlet thereof.

In testimony whereof I have hereunto signed my name.

FRANK BEEMER.

Witnesses:
 CLIFFORD K. CASSEL,
 FRANK E. FRENCH.